Nov. 8, 1938.  E. HERING  2,136,049
TRANSMISSION MECHANISM
Filed Feb. 11, 1937   5 Sheets-Sheet 1
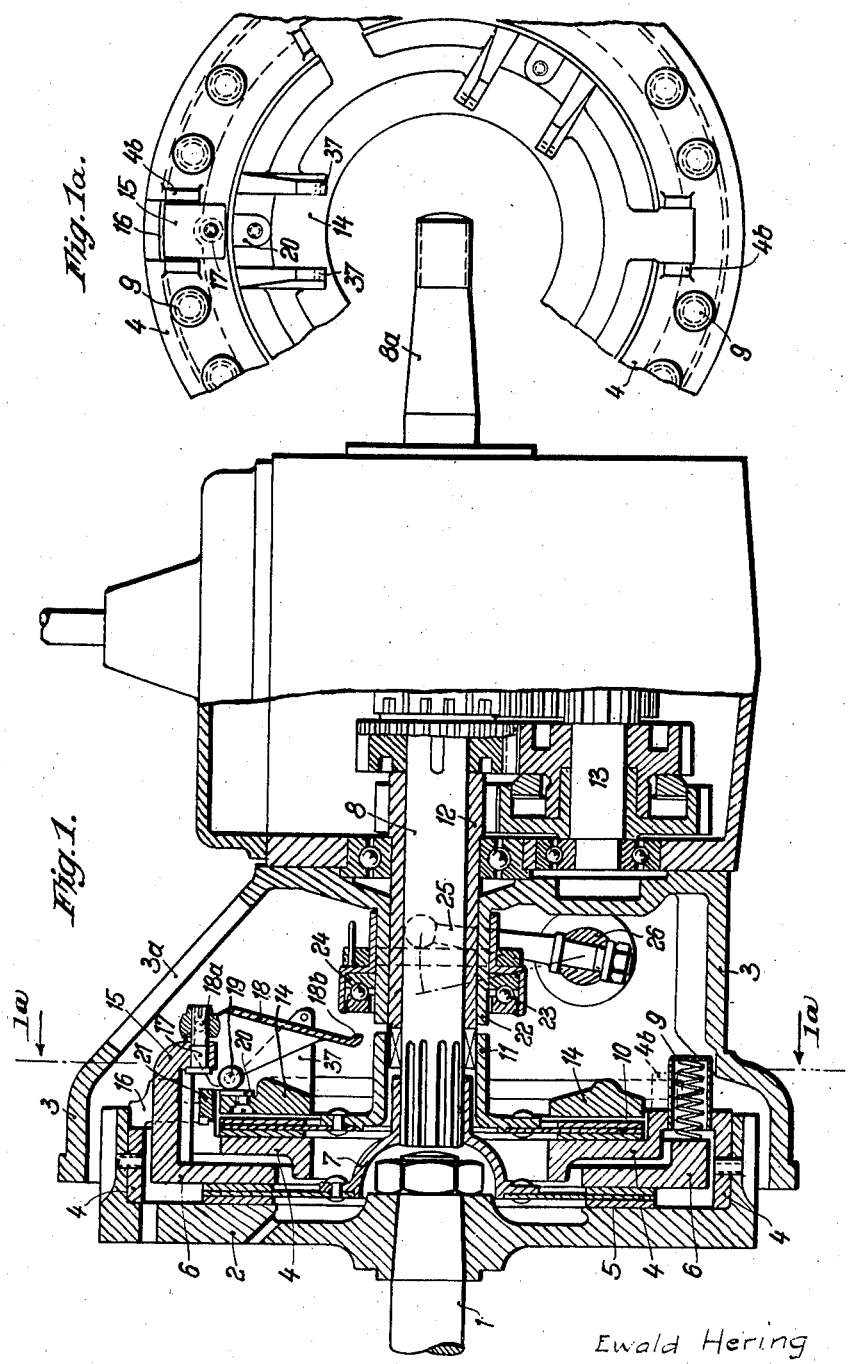
Ewald Hering
Inventor:
By Otto Munk
his Atty.

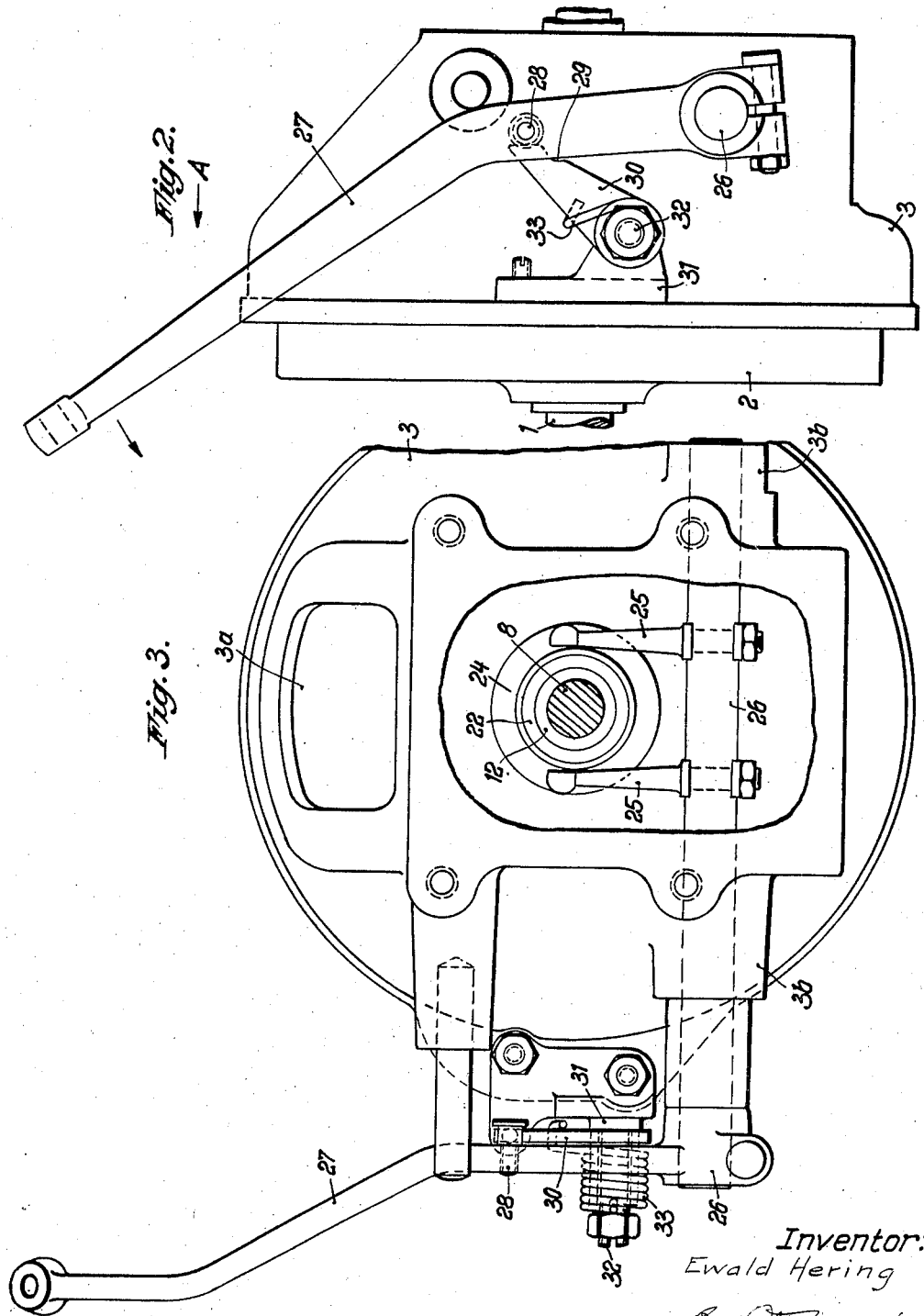

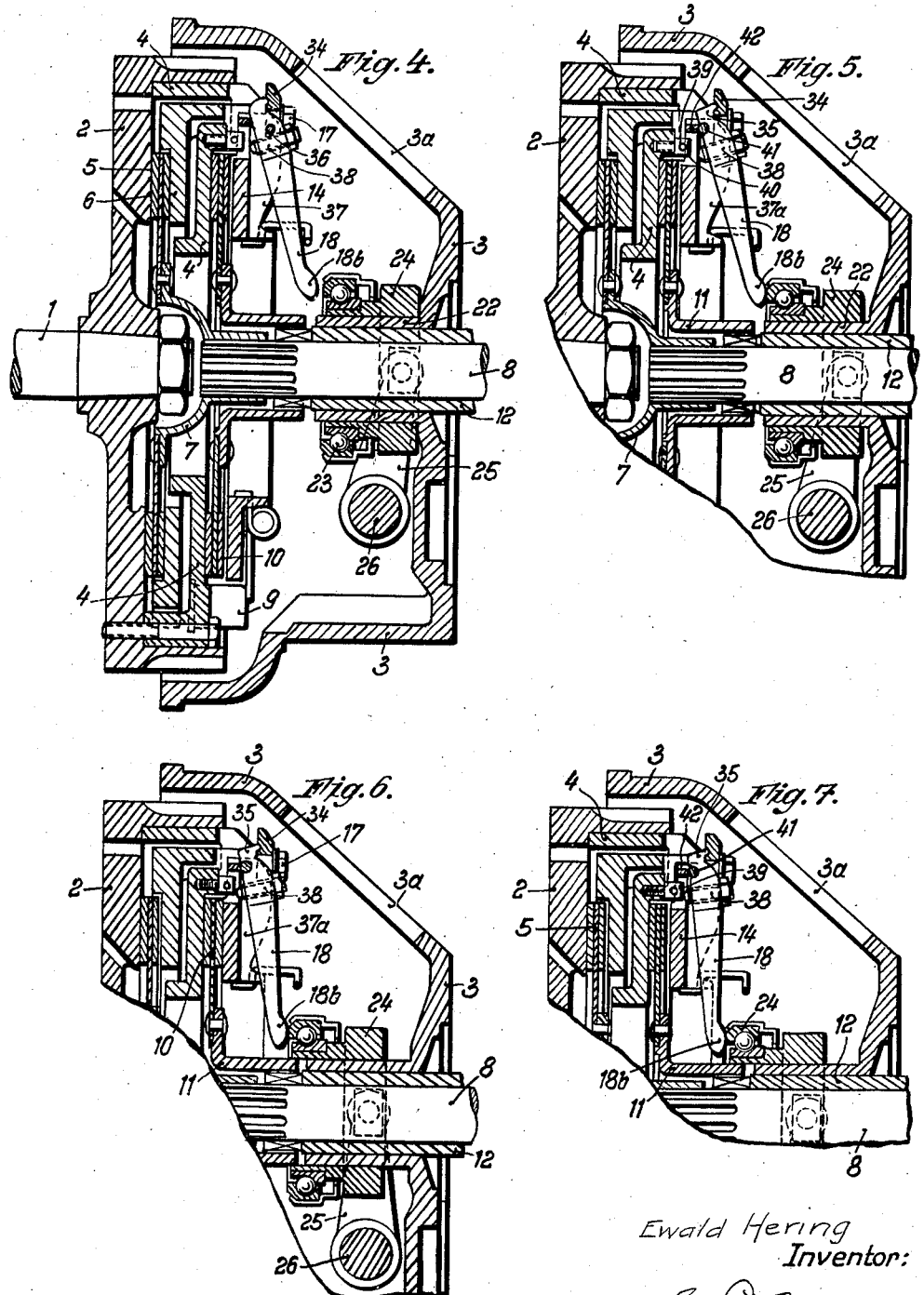

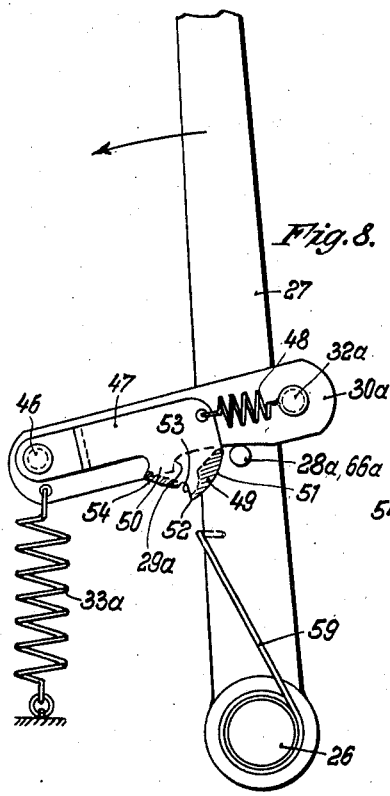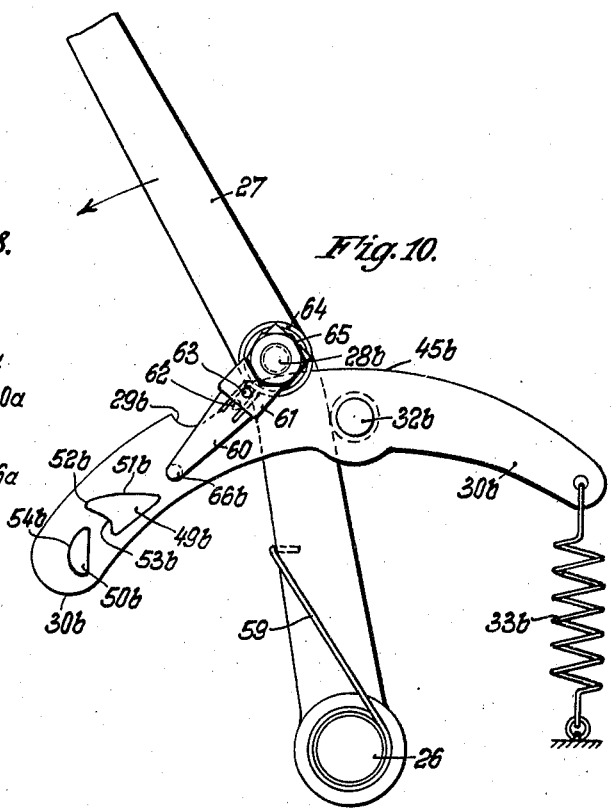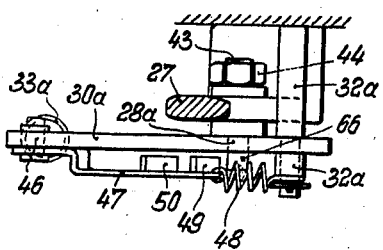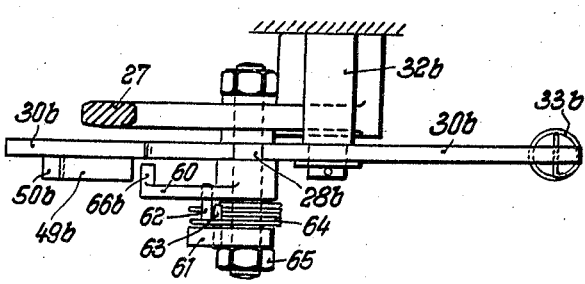

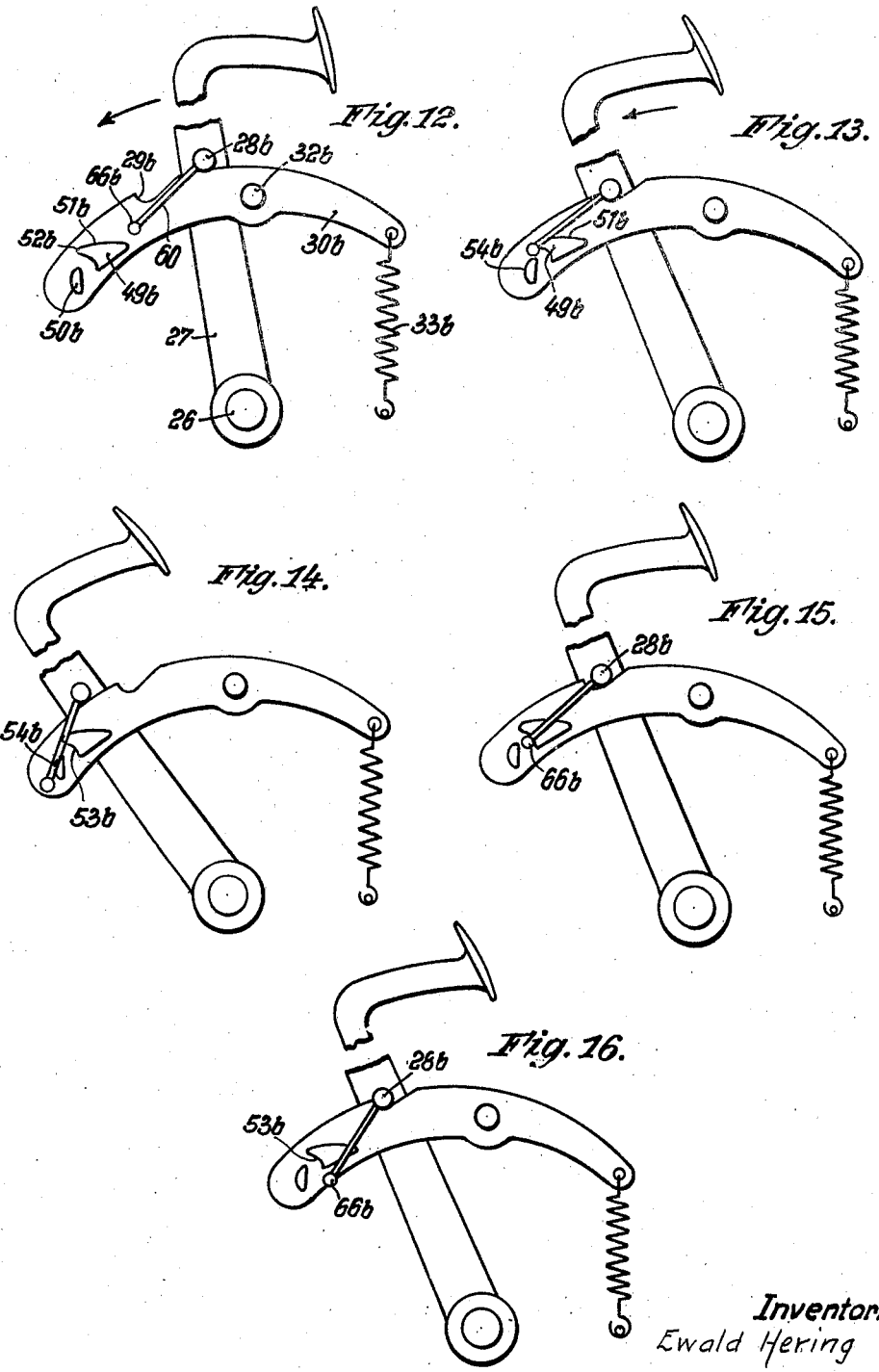

Patented Nov. 8, 1938

2,136,049

UNITED STATES PATENT OFFICE 2,136,049

TRANSMISSION MECHANISM

Ewald Hering, Berlin-Siemensstadt, Germany

Application February 11, 1937, Serial No. 125,251
In Germany February 15, 1936

14 Claims. (Cl. 192—48)

The invention relates to motor vehicles and more particularly to the transmission mechanism thereof, and to the clutch device in connection with a more expeditious operation of the several steps of speed provided for in the gear transmission.

The invention relates further particularly to the design of a double clutch device arranged to connect either an auxiliary driven shaft or the final driven shaft under interposition of the transmission mechanism with the shaft of the motor.

The use of a double clutch device comprising a main clutch of a substantially usual type and an auxiliary clutch device affords the possibility of passing from one speed step to another only by operation of the clutch operating pedal while in using a single clutch as it is the case at present, the driver first has to operate the pedal for disengaging the clutch, second to shift by the main lever the gearing and third to return the clutch pedal to its starting position. Apparently a large advantage with an arrangement according to the invention is obtained as instead of three steps of operation only one step, i. e., the operation of the clutch pedal is required.

The use of double clutch devices has been already proposed but said devices possess a number of drawbacks as it is, for instance, not possible, to disengage simultaneously the main clutch and the auxiliary one from the driving shaft. The double clutch devices already known possess the further disadvantage, that in some cases the auxiliary clutch has to be shifted under load to disengage the main clutch, in result of which it was necessary to interpose rolls or balls between the auxiliary clutch disk and the shaft on which the clutch is axially shifted to facilitate its shifting movements.

A further considerable disadvantage of doubleclutch devices already known is that the manner of operation of the double-clutch devices differs materially from the manner of operation of the usual single type, as in the known double-clutch devices first the master control lever of gearing is operated and in succession the clutch pedal while in usual operation of motor-cars first the clutch pedal is operated to disengage the clutch and then the transmission lever. Accordingly it is not possible for a driver who once drives a usual car, the clutch device whereof is of the single clutch type, to drive at another time a car the clutch whereof is of the double-clutch type.

A further object of the invention relates to the device for shifting the clutch operating members in such manner, that, as explained above, the main clutch is disengaged while simultaneously the auxiliary clutch is engaged and reversely, and that in one control position both clutches together are disengaged. The control device according to the invention is further arranged in such a manner, that in attaining the middle position wherein the auxiliary clutch is in its engaging position and the main clutch in its disengaged position the operating clutch pedal falls automatically into a groove, whereby the driver feels that the desired control step is obtained. In a further modification the clutch pedal has an arrangement, wherein the pedal is automatically blocked in its middle position but on desire it can either be shifted further to its final position to disengage both clutches or it can be returned to its starting position to disengage the auxiliary clutch and simultaneously to engage the main clutch.

Other objects of the invention will appear from the following description in connection with the drawings, wherein some examples of the invention are shown.

In the drawings—

Figure 1 is a longitudinal section through a double-clutch device according to the invention, Figure 1a shows in a section on the line 1a—1a of Figure 1 a view of details of the arrangement of Figure 1.

Figure 2 is a side view of the double-clutch operating pedal.

Figure 3 is a view of the pedal shown in Figure 2, looking in the direction of the arrow A.

Figure 4 represents a modification of the double clutch in a section similar to Figure 1.

Figures 5–7 represent in similar sections as Figure 4 another modification of the double clutch showing it in its three positions of operation.

Figure 8 is a view showing a further modification of the clutch operating pedal.

Figure 9 is a plan view of the pedal.

Figures 10 and 11 show similar views of another modification of the pedal, and

Figures 12–16 represent the pedal of Figures 10 and 11 in its various positions of operation.

Referring to the drawings, 1 represents the shaft driven by the motor on which shaft the flywheel 2 is fixed, which revolves in the front part of the clutch casing 3 having an aperture 3a. With the fly-wheel 2 a plate-like body 4 is connected, a space remaining between it and said fly-wheel to receive the main clutch plate 5 and a plate-like body 6 axially movable and arranged to be moved against and from the clutch plate 5, to engage or disengage same with the driving motor shaft 1. The hub 7 of the main clutch plate 5 is splined upon the forward end of the driven shaft 8. On its axial movement the plate 6 is guided for instance by guiding ribs or the like, provided on the plate 4 while it is permanently forced by a plurality of springs 9 (whereof only one is shown in Figure 1 in the drawings) arranged on the circumference of a circle, towards the main clutch plate 5. Behind the opposite face of the plate 4 the plate 10 of an additional or auxiliary clutch is arranged to be engaged with and disengaged from said plate 4, the hub 11 of said clutch plate 10 being splined on a hollow shaft 12 which freely revolves on the shaft 8 and by means of the gearing cooperates with the intermediate gear shaft 13 and therefrom with the main drive shaft 8a of the vehicle. In the rear of the auxiliary clutch plate 10 an axially movable plate 14 is arranged which in a suitable manner as by means of flanges 4b or the like is guided by the plate 4 and, when it is axially moved towards the fly-wheel 2, forces the clutch plate 10 against the plate 4 engaging it with the drive shaft 1 of the motor.

Arms 15 extending from the axially movable plate 6 of the main clutch through apertures 16 of the plate 4 have their ends bent inwardly and arranged to support bolts 17 upon the pins 18a of which levers 18 may be swung (only one of said levers being shown in the drawings). Each of the levers 18 is provided on its forward face with a roll or ball 19 adapted to engage a thrust-plate 20 arranged on the adjacent face of the axially movable auxiliary clutch plate 14. Adjacent each of the plates 20 a stop 21 is attached to the plate 4 and the roll 19 is arranged to pass over said stop 21 at the end of the movement of the lever 18.

On the hub 22 of the clutch casing 3 an axially movable control member 24 is arranged for a reciprocating movement the forward part of which is rotatable relatively to the member by means of a ball bearing 23. A pressure ring 24a is mounted on the axially projecting hub of the ball bearing and connected to the latter by means of pins 24b. A pair of control levers 25 (Figure 3) are provided to press against the press ring 24a and to shift the control member 24 on the hub 22 axially towards the left. The levers 25 are attached to the shaft 26 which may be supported in bearings 3b, in the side walls of the clutch casing 3. Beyond the casing 3 on the end of the shaft 26 the clutch operating pedal 27 is attached.

When the clutch operating pedal 27 is in its rest- or off-position the springs 9 force the movable plate 6 towards the fly-wheel 2 with the result that the main clutch plate 5 is pressed between the fly-wheel 2 and the plate 6. As the auxiliary clutch in this position of the pedal 27 is disengaged, the power from the driving shaft 1 is transmitted through the fly-wheel 2, the main clutch disk 5, and the hub 7 to the driven shaft 8.

When the clutch operating pedal 27 is actuated the shaft 26 swings levers 25, and the member 24 is advanced towards the fly-wheel 2, until its front face comes into contact with the ends 18b of the levers 18, swinging the same with the result that the ball or press-roll 19 is applied to the cooperating thrust-plate 20, engaging the axially movable plate 14 with the clutch plate 10 of the additional clutch. When the roll or ball 19 is pressed against the plate 14 with a pressure sufficient to compensate that of springs 9, the pivot 18a of the lever 18 moves rearwards. Thus the axially movable body 6 of the main clutch is drawn rearwardly against the action of springs 9, so that the pressure between the clutch-plate 5 and the fly-wheel 2 is released. Accordingly, power from shaft 1 is transmitted through the fly-wheel 2, the plate 4, plate 10 of the additional clutch and the hollow shaft 12 to the gear train.

When the auxiliary clutch has been engaged, the clutch operating pedal 27 has reached its middle position, which position is indicated to the driver by the fact that the bolt 28 of the pedal 27 falls under the action of a spring 33 into a groove 29 of a lever 30 pivoted on the shaft 32 supported in bearings 31 arranged on the casing 3 or on another stationary part of the vehicle.

Upon moving the pedal 27 from its middle position, wherein its bolt 28 is resting in the grove 29, further to the left, the control member 24 by means of the levers 25 is further advanced to the left towards the fly-wheel 2 whereby the levers 18 are turned further, so that the roll or ball 19 moves from the thrust-plate 20 and arrives upon the stationary plate 21, releasing the clutch plate 10 of the additional clutch as well as the movable plate 6 of the main coupling with the result that the transmission of power through the main clutch as well as through the additional clutch is interrupted.

It is apparent that the double clutch device as described above by full shifting of the pedal 27 can be disengaged completely, the balls or rolls 19 rolling upon the faces 21 which are not movable in axial direction whereby it is possible in this position of the pedal to operate the gear shifting lever for selecting any of the speed steps quite in the same manner as with a usual single clutch device. The gearing and its shifting device can be arranged in a manner as described and shown in details in my copending application Ser. No. 125,834 filed on February 15, 1937, so that, when the main clutch is engaged the driver is in a position to prepare by operating of the master control lever a speed step of the gearing connected with the auxiliary clutch, and when the latter clutch is in its engaging position the driver is able simultaneously to prepare another step of gearing connected with the main clutch. Upon releasing of the pedal 27 first the auxiliary clutch is engaged whereby the car will run at a predetermined ratio of transmission and by further releasing the pedal 27 the driver can disengage the additional clutch device and simultaneously engage the main clutch, whereupon the car will run at a different previously set ratio of transmission, i. e. always two speed steps can be put in operation in immediate succession merely by operating the pedal 27, and without the intervention of the master shift lever. Preferably the gear transmission can be arranged in such manner that always the lower speed is operated by the auxiliary clutch device while the higher speed is operated by the main clutch, as normally the car runs with the higher speed, wherein the pedal 27 is in its rest position.

Figure 4 represents a modified embodiment of the invention wherein the bolts 17 which are supported in arms 15 extending from the movable main clutch thrust-body 6 are provided with abutments 34, which also may be integral with the body 6.

Into each of the abutments 34 a nose 35 of the levers 18 engages which levers can be swung upon the pivots 36, supported between flanges 37 which extend from the thrust-plate 14 of the auxiliary clutch. The body of each of the levers 18 is provided with a thread into which a bolt 38 adjustably is screwed the left side end of which cooperates with stops 39 connected with the axially fixed plate 4 and extending into apertures 40 of the auxiliary thrust-plate 14.

In the embodiment according to the Figures 5, 6 and 7 each of the levers 18 is provided with a press-roll 41 which may apply against the edge 42 of the plate 14. Flanges 37a extending from the plate 14 constitute side guides for the lever 18. By swinging the levers 18 by means of the pedal 27, levers 25, and control member 24 in the manner described above about the pivot 36 (Figure 4), the nose 35 of each lever 18 is forced against abutment 34 withdrawing the plate 6 from the main clutch plate 5 whereby the main clutch is disengaged from the fly-wheel. At the same time the pivot 36 (Figure 4) is shifted together with the movable plate 14 against the auxiliary clutch-plate 10 whereby this clutch-plate engages the plate 4 or the fly-wheel 2, as the plate 4 constitutes a part of the fly-wheel. When turning the lever 18 further clockwise by the aforesaid means the forward end of the bolt 38 engages the stop 39 which is stationary with respect to axial movement, whereupon the point of engagement constitutes a fulcrum for the further swinging movement of the lever 18. Accordingly the pivot 36 together with the plate 14 is moved to the right and withdrawn from the plate 10, whereby the auxiliary clutch device is disengaged, while the main clutch, as mentioned above, was disengaged at the beginning of the swinging movement of the levers 18 and its plate 6 now is further withdrawn from the clutch plate 5 against the action of the springs 9.

In Figures 5–7 three positions of operation are shown in connection with a modified embodiment of the clutch device wherein each lever 18 is pivoted upon a roll 41, which applies to the edge 42 of the plate 14. In the position shown in Figure 5 the main clutch is in its engaging position while the auxiliary clutch is disengaged, Figure 6 shows the auxiliary clutch in its engaging position and the main clutch in disengaged state, and Figure 7 shows both clutches, i. e., the main clutch as well as the auxiliary clutch in their disengaged positions.

The clutch pedal shown in Figures 8 and 9 is provided with a bolt 28a, the screwed end 43 of which is connected by a nut 44 with the pedal 27. A lever 30a is pivoted upon a stationary pivot 32a, and by the action of a spring 33a which is fastened to a fixed part of the car, the lever 30a is forced against said bolt 28a, to cooperate with a cam surface 45 formed on the lever 30a. A groove 29a is provided in said cam surface 45. Upon a bolt 46 fastened on the lever 30a a latch 47 is pivoted, the opposite end of which is connected to the bolt 32a by means of a spring 48. On the surface of latch 47 adjacent to the lever 30a two lugs 49 and 50 are arranged which cooperate with the forward end 66 of the same bolt 28a, which, as set forth, also cooperates with the cam surface 45 of the lever 30a.

The operation of the pedal 27 is the following:
On swinging the pedal 27 in the sense of the arrow in Figure 8 to the left the bolt 28a slides with its middle part over the cam surface 45 of the lever 30a until it falls into groove 29a, while simultaneously the forward part 66 of the same bolt 28a slides along the cam surface 51 of the lug 49, lifting the same against the action of spring 48 until the bolt has passed beyond the point 52 of the surface of lug 49 whereupon it falls into the concave formed surface 53 of the lug whereby the pedal 27 is arrested in its middle position wherein the main clutch is in its disengaged position and the auxiliary clutch in its engaging position with the driving shaft 1 and the flywheel 2. On advancing the pedal 27 from this position, the middle part of bolt 28a leaves the groove 29a of the lever 30a, while the forward part 66 of the same bolt engages the cam surface 54 of the lug 50 and sliding along said surface arrives at the point 55 of the lug, in which position of the pedal the main clutch as well as the auxiliary clutch are disengaged.

When the pedal 27 returns under the action of spring 59, the middle part of bolt 28a returns on the cam surface 45 of the lever 30a, while the forward part 66 of the bolt 28a returns along the cam surface 54 of the lug 50 to fall again into the concave formed surface 53 of the lug 51 whereby the pedal 27 is again arrested. To return the pedal 27 fully to its starting or rest position the bolt 28a is released by a short depressing movement from the groove 29a as well as from the groove 53 of the lug 49 whereupon the pedal 27 returns to its starting position. By suitably forming the remaining surfaces of the lugs 49 and 50 it appears possible as will be described hereafter in connection with another modification to let the bolt 66 slide along said surface upon the return movement of the pedal and to cause immediate return of the pedal 27 to its starting position without being arrested in its middle position.

In a further modification of the invention shown in Figures 10–16 the pedal 27 can be swung against the action of the spring 59 from its rest position in the sense of the arrow to the left. A bolt 28b is rigidly connected with the pedal 27 on the forward end of which a latch 60 is pivoted, which by means of a plate 61 and a spring 64 wound on the bolt 28b is yieldably connected with bolt 28b, the ends of spring 64 embracing two pins 62 and 63 arranged on the latch 60 and plate 61, whereby the latch always is forced into the same position relatively to the plate 61 and to the bolt 28b. By means of nut 65 plate 61 is insured in its fixed position on bolt 28b. A pin 66b is arranged on the forward end of latch 60.

On moving the pedal 27 to the left bolt 28b slides along the cam surface 45b of the lever 30b, which is pivoted on the stationary pivot 32b and is forced by spring 33b against the bolt 28b, while simultaneously the pin 66b engages the cam surface 51b of a lug 49b upstanding laterally from the lever 30b, till the bolt 28b falls into the groove 29b. At the same time pin 66b having passed beyond the upper point 52b of lug 49b, falls into the concave curved surface 53b, whereby the pedal 27 is arrested in its middle position, wherein, as above described, the main clutch is disengaged and the auxiliary clutch is engaged with the driving shaft (Figure 15). When the pedal 27 from its position shown in Figure 15 is further advanced to the left, to disengage both clutches simultaneously, the pin 66b engages the cam surface 54b of lug 50b and sliding along said surface occupies the position shown in Figure 14, wherein both clutches are disengaged.

To release the pedal 27 from the position shown in Figure 15 the pin 66b is released by a short depression of the pedal, whereupon the pin arrives at the position shown in Figure 16. From this position the pedal can be readily returned into its starting position shown in Figure 12 by simply releasing it. By further depressing the pedal from the position shown in Figure 16, the pedal and the pin 66b are moved to the position shown in Figure 14 in which position both clutches are out of engagement, and from this position the pin 66b slides upwardly over the cam surface 54b and returns into the concave recess 53b, of the lug 50b (Figure 15) from where it can be returned to its starting position (Figure 12) by a short depression of the pedal over the position shown in Figure 16.

While I have herein described in some detail some specific embodiments of my invention I do not desire it to be understood that my invention is limited to the embodiments described and shown herein as it will be apparent that various changes may be made herein without departing from the spirit or scope of my invention.

Having thus described the various features of my invention, what I claim is:

1. In a transmission mechanism a driving shaft, a member rigid on said driving shaft and having two coupling surfaces, a main clutch, resilient means to normally press said main clutch against one of said surfaces, an auxiliary clutch arranged to cooperate with the second surface and clutch operating means, said means including a lever having one fulcrum operating on said main clutch and a second fulcrum operating on said auxiliary clutch to withdraw said main clutch from its corresponding surface against the action of said resilient means thereby reducing the coupling pressure of said main clutch and simultaneously to proportionally increase the coupling pressure of the auxiliary clutch.

2. In a transmission mechanism, a driving shaft, a member rigid on said driving shaft and having two coupling surfaces, a main clutch yieldably pressed against one of said surfaces, an auxiliary clutch arranged to cooperate with the second surface, and a clutch operating means to act during one phase of its operation on said main and auxiliary clutches so as to release the main clutch and simultaneously bring the auxiliary clutch into engagement and during a subsequent phase of its operation to release the auxiliary clutch while the main clutch is still in inoperative position.

3. In a transmission mechanism a driving shaft, a member rigid on said driving shaft and having two coupling surfaces, a main clutch, resilient means to normally press said main clutch against one of said surfaces, an auxiliary clutch arranged to cooperate with the second surface, clutch operating means, said means including a control member and a lever governed by said control member, said lever having one fulcrum operating on said main clutch and a second fulcrum operating on said auxiliary clutch, and a thrust plate rigid with said member on the driving shaft and arranged to support a fulcrum of said lever during one phase of its operation.

4. In a transmission mechanism a driving shaft, two driven members, a flywheel rigid on said driving shaft, a plate element rigidly connected with and axially spaced from said flywheel, an axially shiftable clutch plate disposed in the space between said fly-wheel and said plate element and adapted to transmit rotation to one of said driven members, an axially shiftable actuating member for said main clutch plate arranged for rotation with said fly-wheel and disposed adjacent said main clutch plate in the space between said plate element and fly-wheel, an axially shiftable auxiliary clutch plate disposed adjacent the face of said plate element opposite said fly-wheel and adapted to transmit rotation to the second driven member, an auxiliary actuating member arranged for rotation with the flywheel adjacent said auxiliary clutch plate, and clutch operating means to act during one phase of its operation on said main and auxiliary actuating members so as to withdraw said main actuating member and main clutch plate from the fly-wheel and simultaneously to engage said auxiliary actuating member and clutch plate with said plate element, and during a subsequent phase of its operation to release the auxiliary actuating member and clutch plate while the main actuating member and clutch plate are still withdrawn from the fly-wheel.

5. In a transmission mechanism a driving shaft, two driven members, a flywheel rigid on said driving shaft, a plate element rigidly connected with and axially spaced from said flywheel, an axially shiftable clutch plate disposed in the space between said flywheel and said plate element and adapted to transmit rotation to one of said driven members, an axially shiftable actuating member for said main clutch plate disposed adjacent the latter in the space between said plate element and flywheel, control means connected to said main actuating member and projecting through an aperture of said plate element, an axially shiftable auxiliary clutch plate disposed adjacent the face of said plate element opposite said flywheel and adapted to transmit rotation to the second driven member, an auxiliary actuating member arranged for rotation with the flywheel adjacent said auxiliary clutch plate and clutch operating means to act during one phase of its operation on said control means for the main actuating member and said auxiliary actuating member so as to withdraw said main actuating member and main clutch plate from the flywheel and simultaneously to engage said auxiliary actuating member and clutch plate with said plate element, and during a subsequent phase of its operation to release the auxiliary actuating member and clutch plate while the main actuating member and clutch plate are still withdrawn from the flywheel.

6. In a transmission mechanism, a driving shaft, two driven members, a flywheel rigid on said driving shaft, a plate element rigidly connected with and axially spaced from said flywheel, an axially shiftable clutch plate disposed in the space between said flywheel and said plate element and adapted to transmit rotation to one of said driven members, an axially shiftable actuating member for said main clutch plate disposed adjacent the latter in the space between said plate element and flywheel, a series of arms rigid with said main actuating member and projecting through apertures of said plate element, an axially shiftable auxiliary clutch plate disposed adjacent the face of said plate element opposite said flywheel and adapted to transmit rotation to the second driven member, an auxiliary actuating member arranged for rotation with the flywheel adjacent said auxiliary clutch plate, and clutch operating means to act during one phase of its operation on said arms of the main actuating member and on said auxiliary actuating member so as to withdraw said main actuating member and main clutch plate from the flywheel and simultaneously to engage said auxiliary actuating member and clutch plate with said plate element, and during a subsequent phase of its operation to release the auxiliary actuating member and clutch plate while the main actuating member and clutch plate are still withdrawn from the flywheel.

7. In a transmission mechanism, a driving shaft, a member rigid on said driving shaft and having two coupling surfaces, a main clutch detachably engaged with one of said surfaces, an auxiliary clutch arranged to cooperate with the second surface, a control lever having one fulcrum operating on said main clutch so as to withdraw it from its corresponding coupling surface and a second fulcrum formed as a rotary member acting on said auxiliary clutch, so as to press it against its corresponding coupling surface when said lever is actuated in a predetermined direction, and a thrust plate rigid with said member on the driving shaft and arranged to support said rotary member during a subsequent phase of the operation of said lever in the same direction, whereby said auxiliary clutch is released during said subsequent phase of the lever operation, while said main clutch is still in inoperative position.

8. In a transmission mechanism, a driving shaft, a member rigid on said driving shaft and having two coupling surfaces, a main clutch arranged for cooperation with one of said surfaces, an axially shiftable actuating member for said main clutch disposed adjacent the latter, an auxiliary clutch arranged for cooperation with said second surface, an axially shiftable actuating member for said auxiliary clutch, a control lever pivoted at one fulcrum thereof to the auxiliary actuating member and having a second fulcrum operating on said main actuating member, so as to withdraw said main actuating member from said main clutch during one phase of the operation of said lever in a predetermined direction thereby releasing the main clutch and simultaneously to press the auxiliary actuating member against the auxiliary clutch whereby the auxiliary clutch is engaged with the corresponding coupling surface, and an abutment rigid with said member on the driving shaft and arranged to support a third fulcrum on said lever during a subsequent phase of operation of the lever in the same direction, whereby said auxiliary clutch is released while said main clutch is still in inoperative position.

9. In a transmission mechanism, a driving shaft, a member rigid on said driving shaft and having two coupling surfaces, a main clutch detachably engaged with one of said surfaces, an auxiliary clutch arranged to cooperate with the second surface, a series of control levers, each having one fulcrum operating on said main clutch, and a second fulcrum formed as a rotary member to act upon and be linearly displaced with respect to said auxiliary clutch, so as to withdraw the main clutch from its corresponding surface and to engage the auxiliary clutch with the corresponding coupling surface during one phase of operation of said levers in a predetermined direction, and a thrust plate rigid with said member on the driving shaft and arranged to support said rotary member during a subsequent phase of operation of said levers in the same direction, whereby said auxiliary clutch is released during said subsequent phase of the lever operation, while said main clutch is still in inoperative position.

10. In a transmission mechanism, a driving shaft, a member rigid on said driving shaft and having two coupling surfaces, a main clutch normally engaged with one of said coupling surfaces, an auxiliary clutch arranged for cooperation with said second coupling surface, clutch operating means adapted to release the main clutch and to simultaneously actuate the auxiliary clutch during one phase of its operation in a predetermined direction and to release the auxiliary clutch during a subsequent phase of its operation in the same direction while the main clutch is still in inoperative position, a pedal to control said clutch operating means, and a guide member for said pedal having a groove to be engaged by said pedal when it arrives at the middle position in which the auxiliary clutch is engaged and the main clutch is disengaged.

11. In a transmission mechanism, a driving shaft, a member rigid on said driving shaft and having two coupling surfaces, a main clutch, normally engaged with one of said coupling surfaces, an auxiliary clutch arranged for cooperation with said second coupling surface, clutch operating means adapted to release the main clutch and to simultaneously actuate the auxiliary clutch during one phase of its operation in a predetermined direction and to release the auxiliary clutch during a subsequent phase of its operation in the same direction while the main clutch is still in inoperative position, a pedal to control said clutch operating means, a guide member for said pedal having a groove to be engaged by said pedal when it arrives at the middle position in which the auxiliary clutch is engaged and the main clutch is disengaged, and cam surfaces associated with said guide member to guide the pedal from said middle position at will either to its starting position, in which the main clutch is engaged to its extreme position in which both clutches are disengaged.

12. In a transmission mechanism, a driving shaft, a member rigid on said driving shaft and having two coupling surfaces, a main clutch normally engaged with one of said coupling surfaces, an auxiliary clutch arranged for cooperation with said second coupling surface, clutch operating means adapted to release the main clutch and to actuate the auxiliary clutch during one phase of its operation in a predetermined direction and to release the auxiliary clutch during a subsequent phase of its operation in the same direction while the main clutch is still in inoperative position, a pedal to control said clutch operating means, a guide member carried on said pedal, a lever having a cam surface and resilient means to yieldably press said lever with its cam surface against said guide member on the pedal, said cam surface being provided with a groove to receive said guide member on the pedal when the latter arrives at the middle position in which said auxiliary clutch is engaged and said main clutch is disengaged.

13. In a transmission mechanism, a driving shaft, a member rigid on said driving shaft and having two coupling surfaces, a main clutch normally engaged with one of said coupling surfaces, an auxiliary clutch arranged for cooperation with said second coupling surface, clutch operating means adapted to release the main clutch and to simultaneously actuate the auxiliary clutch during one phase of its operation in a predetermined direction and to release the auxiliary clutch during a subsequent phase of its operation in the same direction while the main clutch is still in inoperative position, a pedal to control said clutch operating means, a guide member carried on said pedal, a stationary bolt, a lever pivoted on said stationary bolt and having a cam surface, a spring forcing said lever with its cam surface against said guide member, a latch being pivotally supported at one of its ends on said lever, a spring connecting the opposite end of said latch to said stationary bolt, and a cam surface on said latch including two lugs separated by a concave recess, adapted to be engaged by said guide member when the pedal is in its middle position, said cam surface on said lever being provided with a groove adapted to accommodate said guide member when engaged in said conical recess.

14. In a transmission mechanism, a driving shaft, a member rigid on said driving shaft and having two coupling surfaces, a main clutch normally engaged with one of said coupling surfaces, an auxiliary clutch arranged for cooperation with said second coupling surface, clutch operating means to release the main clutch and to simultaneously actuate the auxiliary clutch during one phase of its operation in a predetermined direction and to release the auxiliary clutch during a subsequent phase of its operation in the same direction while the main clutch is still in inoperative position, a pedal to control said clutch operating means, a return spring for said pedal, a guide pin laterally projecting from said pedal, a latch pivotally carried on the free end of said pin, a spring cooperating with said pin and said latch to hold the latter in a predetermined angular position with respect to said pedal, a second guide pin at the free end of said latch, a stationary bolt, a double armed lever pivoted on said stationary bolt and including a cam surface on one arm thereof, a spring acting upon the second lever arm and urging said cam surface against the guide pin on said pedal, said cam surface being provided with a groove to accommodate said first mentioned guide pin when said pedal is in a middle position, and two cam lugs on the free arm of said lever to guide said second guide pin on the latch, one of said lugs having a concave recess to receive said second guide pin when said first-mentioned guide pin rests in the groove of the cam surface on said lever, said guide pins being released from said groove and conical recess when the pedal is further depressed from said middle position, and said cam lugs being formed to guide the latch and pedal from said released position at will either to an extreme position in which both clutches are disengaged and from which the pedal can be restored by means of its return spring selectively to said middle position or to its initial position, or on release of the pedal directly to the initial position in which the main clutch is engaged and the auxiliary clutch disengaged.

EWALD HERING.